(12) United States Patent
Santiago Benito et al.

(10) Patent No.: US 9,163,611 B2
(45) Date of Patent: Oct. 20, 2015

(54) METHODS AND SYSTEMS FOR OPERATING A WIND TURBINE COUPLED TO A POWER GRID

(75) Inventors: Pedro Luis Santiago Benito, Mostoles (ES); Eugenio Yegro Segovia, Serranillos del Valle (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/347,332

(22) PCT Filed: Sep. 29, 2011

(86) PCT No.: PCT/ES2011/070684
§ 371 (c)(1),
(2), (4) Date: Mar. 26, 2014

(87) PCT Pub. No.: WO2013/045717
PCT Pub. Date: Apr. 4, 2013

(65) Prior Publication Data
US 2014/0246856 A1    Sep. 4, 2014

(51) Int. Cl.
*F03D 9/00*    (2006.01)
*H02P 9/04*    (2006.01)
*F03D 7/04*    (2006.01)
*F03D 7/02*    (2006.01)

(52) U.S. Cl.
CPC ............. *F03D 7/042* (2013.01); *F03D 7/0224* (2013.01); *F03D 7/0296* (2013.01); *F03D 9/003* (2013.01); *F05B 2260/96* (2013.01); *F05B 2270/333* (2013.01); *F05B 2270/337* (2013.01); *Y02E 10/723* (2013.01)

(58) Field of Classification Search
USPC ....................................................... 290/44, 55
See application file for complete search history.

(56) References Cited

U.S. PATENT DOCUMENTS

| | | | |
|---|---|---|---|
| 4,246,522 A * | 1/1981 | Bourke et al. | 388/806 |
| 5,096,383 A * | 3/1992 | Dobrzynski | 416/200 R |
| 6,566,764 B2 * | 5/2003 | Rebsdorf et al. | 290/44 |
| 6,670,721 B2 * | 12/2003 | Lof et al. | 290/44 |

(Continued)

FOREIGN PATENT DOCUMENTS

| | | |
|---|---|---|
| EP | 2085611 A2 | 8/2009 |
| EP | 2177755 A2 | 4/2010 |

OTHER PUBLICATIONS

Translation of PCT International Search Report from corresponding PCT Application No. PCT/ES2011/070684, dated Nov. 5, 2012.

*Primary Examiner* — Pedro J Cuevas
(74) *Attorney, Agent, or Firm* — Global Patent Operation; Douglas D. Zhang

(57) ABSTRACT

According to the present disclosure, a method of operating a wind turbine (10) coupled to a power grid (92) for delivering electric power thereto is provided. The method includes: a) operating the wind turbine (10) in a noise reduction mode; b) determining whether the power grid (92) is in an unstable grid state corresponding to an increase of power demand; and, c) increasing the electric power delivered by the wind turbine (10) to the power grid (92) during a stabilization time period for supporting stabilization of the unstable grid. Further, the increasing of the electric power for supporting stabilization of the unstable grid is performed such that a resulting noise increase is below a selected upper level. In addition thereto, a control system and a wind turbine for performing the above method are provided.

20 Claims, 4 Drawing Sheets

(56) References Cited

U.S. PATENT DOCUMENTS

| | | | |
|---|---|---|---|
| 6,856,038 B2 * | 2/2005 | Rebsdorf et al. | 290/44 |
| 6,911,848 B2 * | 6/2005 | Vinciarelli | 327/108 |
| 6,934,166 B2 * | 8/2005 | Vinciarelli | 363/17 |
| 6,975,098 B2 * | 12/2005 | Vinciarelli | 323/266 |
| 6,984,965 B2 * | 1/2006 | Vinciarelli | 323/266 |
| 7,081,689 B2 * | 7/2006 | Tilscher et al. | 290/44 |
| 7,145,786 B2 * | 12/2006 | Vinciarelli | 363/17 |
| 7,957,160 B2 * | 6/2011 | Babcock et al. | 363/16 |
| 8,169,102 B2 * | 5/2012 | Lin et al. | 290/55 |
| 8,500,062 B2 * | 8/2013 | Brunken, Jr. | 244/17.11 |
| 9,013,053 B2 * | 4/2015 | Lee et al. | 290/55 |
| 2002/0092802 A1 * | 7/2002 | Evana et al. | 210/143 |
| 2003/0227280 A1 * | 12/2003 | Vinciarelli | 323/265 |
| 2004/0174147 A1 * | 9/2004 | Vinciarelli | 323/266 |
| 2004/0183513 A1 * | 9/2004 | Vinciarelli | 323/284 |
| 2004/0184289 A1 * | 9/2004 | Vinciarelli | 363/15 |
| 2005/0194787 A1 * | 9/2005 | Tilscher et al. | 290/8 |
| 2005/0286271 A1 * | 12/2005 | Vinciarelli | 363/17 |
| 2009/0073726 A1 * | 3/2009 | Babcock | 363/20 |
| 2010/0253084 A1 * | 10/2010 | Lin et al. | 290/55 |
| 2011/0149618 A1 * | 6/2011 | Babcock et al. | 363/40 |
| 2011/0304141 A1 * | 12/2011 | Van Dyck et al. | 290/44 |
| 2013/0127173 A1 * | 5/2013 | Lee et al. | 290/55 |
| 2013/0272844 A1 * | 10/2013 | Lobato Pena et al. | 415/1 |
| 2015/0115610 A1 * | 4/2015 | Quinlan et al. | 290/44 |

\* cited by examiner

METHODS AND SYSTEMS FOR OPERATING A WIND TURBINE COUPLED TO A POWER GRID

BACKGROUND OF THE INVENTION

The subject matter described herein relates, generally, to methods and systems for wind turbines, and more particularly, to methods and systems for reducing noise generation in wind turbines in an efficient manner.

At least some known wind turbines include a tower and a nacelle mounted on the tower. A rotor is rotatably mounted to the nacelle and is coupled to a generator by a shaft. A plurality of blades extends from the rotor. The blades are oriented such that wind passing over the blades turns the rotor and rotates the shaft, thereby driving the generator to generate electricity.

During operation of such known wind turbines, rotational transiting of the blades through air generates aerodynamic acoustic emissions in the form of audible noise. These acoustic emissions may produce noise with a decibel (dB) level that may approach or even exceed local regulatory levels. Accordingly, at least some methods exist for controlling noise from a wind turbine or a wind turbine installation including a plurality of wind turbines (i.e., a wind park). In particular, a wind turbine may be operated such that produced noise is below predetermined dB parameters. Such an operation of a wind turbine for reducing acoustic emissions is also known as noise reduction operation (NRO).

NRO typically implies that a wind turbine generates an electric power below the maximum possible power generation capacity of the wind turbine. Therefore, the operational state of a wind turbine under noise reduction operation is normally not directed to achieve a maximum power output but to comply with noise regulations applying to the wind turbine. However, during NRO, it is important to approach at maximum the capacity of a wind turbine for generating electric power.

BRIEF DESCRIPTION OF THE INVENTION

In one aspect, a method of operating a wind turbine coupled to a power grid for delivering electric power thereto is provided. The method includes: a) operating the wind turbine in a noise reduction mode; b) determining whether the power grid is in an unstable grid state corresponding to an increase of power demand; and, c) increasing the electric power delivered by the wind turbine to the power grid during a stabilization time period for supporting stabilization of the unstable grid. The increasing of the electric power for supporting stabilization of the unstable grid is performed such that a resulting noise increase is below a selected upper level. Typically, an unstable grid state corresponding to an increase of power demand occurs when the frequency of the power grid is below a grid frequency reference value. Exemplarily, but not limited thereto, the grid frequency reference value may be the nominal value of the grid frequency (e.g., 50 Hz or 60 Hz) or a close frequency value.

In another aspect a wind turbine is provided. The wind turbine includes: a rotor rotatable at a rotational speed; at least one rotor blade coupled to the rotor; and, at least one pitch adjustment system coupled to the rotor blade; b) at least one processor coupled to the at least one pitch adjustment system. The at least one processor is programmed for: i) operating the wind turbine for generating noise below a first sound level; ii) determining whether the power grid is in an unstable grid state corresponding to a grid frequency below a grid frequency reference value; iii) increasing the electric power delivered by the wind turbine to the power grid during a stabilization time period for supporting stabilization of the unstable grid. The wind turbine generates noise above the first sound level during the stabilization time period. The at least one processor is further programmed for operating the wind turbine for generating noise below the first sound level after the stabilization time period lapses. A noise increase resulting from supporting stabilization of the unstable grid is below a selected upper level.

In yet another aspect, a wind turbine control system for use in a wind turbine is provided. The control system includes: a) at least one pitch adjustment system coupled to a rotor blade; and, b) at least one processor coupled to the at least one pitch adjustment system. The at least one processor is programmed for: i) operating the wind turbine for generating noise below a first sound level; ii) determining whether the power grid is in an unstable grid state corresponding to a grid frequency below a grid frequency reference value; iii) increasing the electric power delivered by the wind turbine to the power grid during a stabilization time period for supporting stabilization of the unstable grid. The wind turbine generates noise above the first sound level during the stabilization time period. The at least one processor is further programmed for: iv) operating the wind turbine for generating noise below the first sound level after the stabilization time period lapses. A noise increase resulting from supporting stabilization of the unstable grid is below a selected upper level.

The methods and systems described herein facilitate a more efficient noise reduction operation (NRO) of a wind turbine by taking advantage of the potential capability of a wind turbine operating under NRO for stabilizing an unstable grid. In particular, a wind turbine operating under NRO typically disposes of an extra capacity for generating electric power since, during NRO, the wind turbine is likely to generate an electric power below the maximum possible power generation capacity of the wind turbine. According to embodiments herein, efficient NRO may be performed by taking advantage of this extra capacity for generating power for stabilizing an unstable grid. Further, the stabilization may be performed in consideration of a resulting noise increase so that it is facilitated keeping low the noise impact of a stabilization event according to embodiments herein. In particular, the stabilization may be performed such that a noise increase resulting from supporting stabilization of an unstable grid is below a selected upper level.

According to some embodiments, a selected upper level defines an average value. For example, stabilization may be performed such that a noise increase resulting from the stabilization (e.g., due to an increase of rotor speed) does not cause that noise averaged over time exceeds a particular upper noise limit. According to at least some embodiments herein, stabilization of an unstable power grid during NRO may be performed without causing a significant impact on acoustic emissions from the wind turbine and, more specifically, without compromising compliance with noise regulations applying to the wind turbine. According to some embodiments, a selected upper level is a sound level which is not exceeded during a stabilization period. For example, but not limited to, the sound level may correspond to an absolute sound level at a particular time or an averaged sound level.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art is set forth more particularly in the remainder of the specification, including reference to the accompanying figures wherein.

DETAILED DESCRIPTION OF THE INVENTION

Figure 1:
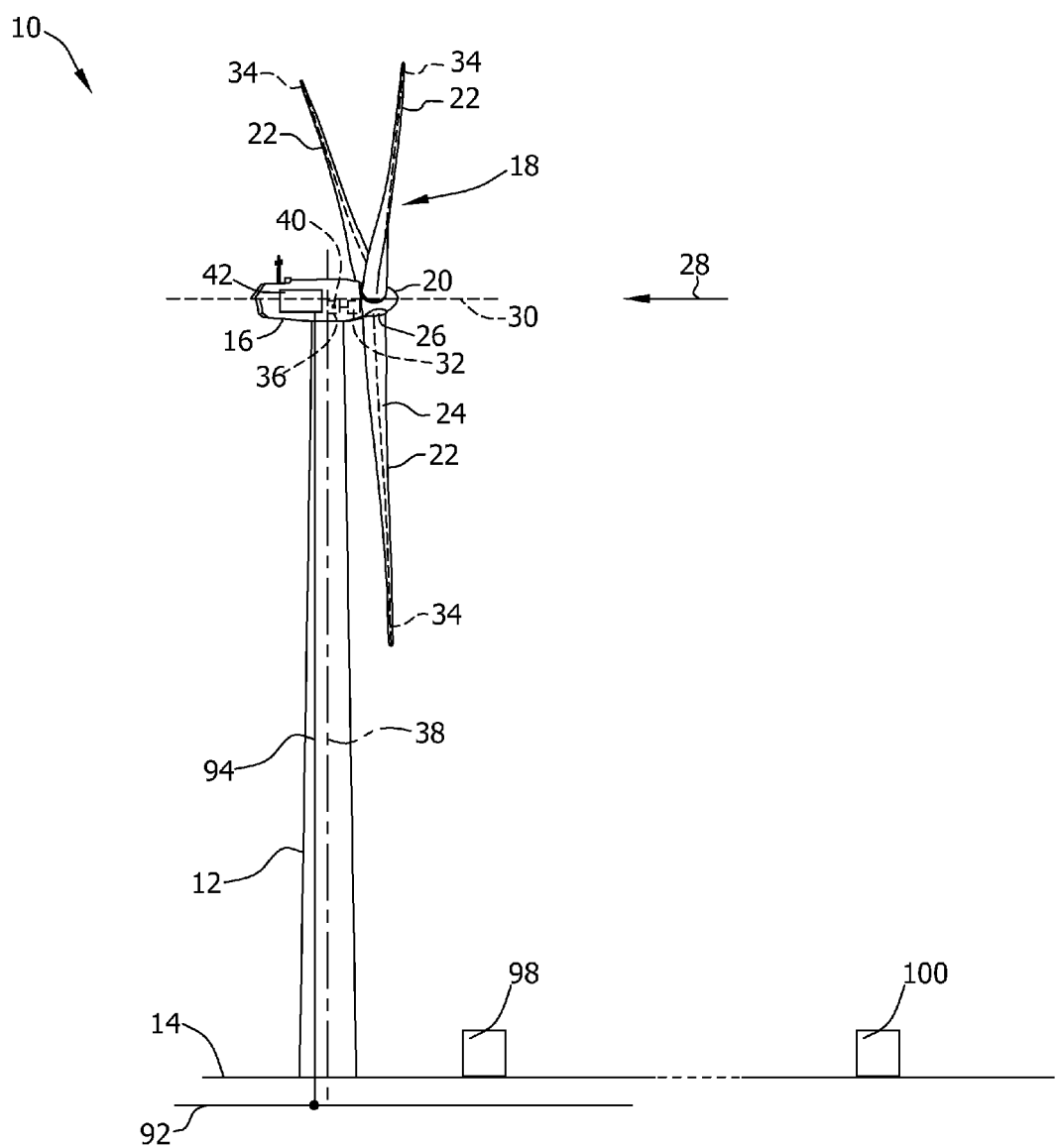
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "wind turbine" is intended to be representative of any device that generates rotational energy from wind energy, and more specifically, converts kinetic energy of wind into mechanical energy. As used herein, the term "wind turbine" is intended to be representative of any wind turbine that generates electric power from rotational energy generated from wind energy, and more specifically, converts mechanical energy converted from kinetic energy of wind to electric power. As used herein, the term "blade" is intended to be representative of any device that provides a reactive force when in motion relative to a surrounding fluid.

According to embodiments herein, operation in a noise reduction mode (also referred to as noise reduced operation) includes controlling or adjusting the operational parameters of a wind turbine so that noise produced by the wind turbine is below some predetermined levels. For example, but not limited to, noise reduction may be for keeping produced noise below a maximum sound level. A maximum sound level may correspond to a noise level generated at a particular time. Alternatively or in addition thereto, noise reduction may be for keeping produced noise below a maximum sound level averaged over a predetermined time. Alternatively or in addition thereto, noise reduction may be for keeping the produced sound level exceeded over a portion of the time (e.g., 10%) under a predetermined limit.

Exemplarily, the rotational speed of the rotor may be reduced for reducing noise generated by the wind turbine. Alternatively or in addition thereto, the pitch angle for each rotor blade may be individually pitched for effectively decreasing noise being generated by the wind turbine. Noise reduction operation is typically such that the wind turbine complies with noise regulations applying in the area in which the wind turbine is being operated. According to embodiments herein, operating a wind turbine in a noise reduction mode typically causes that the wind turbine generates an electric power below the maximum possible power generation capacity of the wind turbine. Typically, this maximum capacity corresponds to the electric power that the wind turbine could potentially generate without operating in the noise reduction mode and in view of the particular wind conditions (see FIG. 3).

As used herein, the term power grid is intended to be representative of an interconnected electricity network for delivering electricity. Typically, the power grid is for delivering electricity from suppliers to consumers. A power grid may support at least one of: (i) electricity generation; (ii) electric power transmission; (iii) electricity distribution; or (iv) electricity control. For example, but not limited thereto, a power grid according to embodiments herein may refer to an entire continent's electrical network, to a regional transmission network, or a sub-network such as a local utility's transmission grid or a distribution grid.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m such as 100 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

Typically, increasing a pitch angle of rotor blades 22 decreases a percentage of blade area exposed to wind. Conversely, decreasing a pitch angle of rotor blades 22 increases a percentage of blade area exposed to wind. For example, a blade pitch angle of approximately 0 degrees (sometimes referred to as a "power position") exposes a significant percentage of blade surface area to wind, thereby resulting in inducement of a first value of lift forces on rotor blades 22. Similarly, a blade pitch angle of approximately 90 degrees (sometimes referred to as a "feathered position") exposes a significantly lower percentage of blade surface area to wind, thereby resulting in inducement of a second value of lift forces on rotor blades 22. The first value of lift forces induced on rotor blades 22 is typically greater than the second value of lift forces induced on rotor blades 22. Therefore, values of lift forces are typically directly proportional to blade surface area exposed to wind. Hence, values of lift forces induced on rotor blades 22 are indirectly proportional to values of blade pitch angle.

Typically, as blade lift forces increase, a linear speed of rotor blades 22 (e.g., at the rotor tip) increases. Conversely, as blade lift forces decrease, linear speed of rotor blades 22 decreases. Therefore, values of linear speed of rotor blades 22 are directly proportional to values of lift forces induced thereon. It follows that linear speed of rotor blades 22 is indirectly proportional to blade pitch angle.

In the exemplary embodiment, a blade pitch of each rotor blade 22 is controlled individually by a control system 36 including a processor 40. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, wind turbine 10 includes an electric generator 42 positioned within nacelle 16 and coupled to rotor 18. Thereby, wind turbine 10 may generate an electric power. Electric generator 42 may be any type of electric generator suitable for generating an electric power according to embodiments herein such as, but not limited to, a variable speed generator. According to embodiments herein, wind turbine 10 is coupled to a power grid 92 for delivering electric power thereto. For example, electric generator 42 may be coupled to power grid 92 through an electrical connection 94. The coupling of wind turbine 10 to power grid 92 is further detailed below with reference to FIG. 4.

According to at least some embodiments, wind turbine 10 is equipped with or operatively coupled to a sensor system for measuring noise related to wind turbine 10. For example, a near field microphone 98 or a system for performing a location noise measurement according to the IEC standard may be provided in the proximity of wind turbine 10 for monitoring noise emissions from wind turbine 10. Near field microphone 98 may be mounted directly on wind turbine 10. Alternatively or in addition thereto, a far field microphone 100 may be located relatively far from wind turbine 10 so that noise impact of wind turbine 10 in a relevant area (e.g., an inhabited area) can be monitored. For example, far field microphone 100 may be installed outside a wind park (not shown) including wind turbine 10. The noise sensor system may additionally be configured to determine a background noise level in the area surrounding wind turbine 10. Background noise level typically corresponds to noise not generated by a wind turbine or, more specifically, by a wind park.

Typically, the noise sensor system is operatively coupled to control system 36 so that acoustic emissions of wind turbine 10 may be controlled online. In particular, the noise sensor system may send a signal to control system 36 including information related to, for example but not limited to, a noise emitted by wind turbine 10, a noise impact of wind turbine 10, and/or a background noise level in a specific area. Noise impact typically corresponds to the influence or effect of acoustical emissions of wind turbine 10 (or a respective wind park) in a specific area. Control system 36 and the noise sensor system may communicate using any appropriate means such as, but not limited to, electrical connections (not shown) or a wireless system (not shown).

Figure 2:
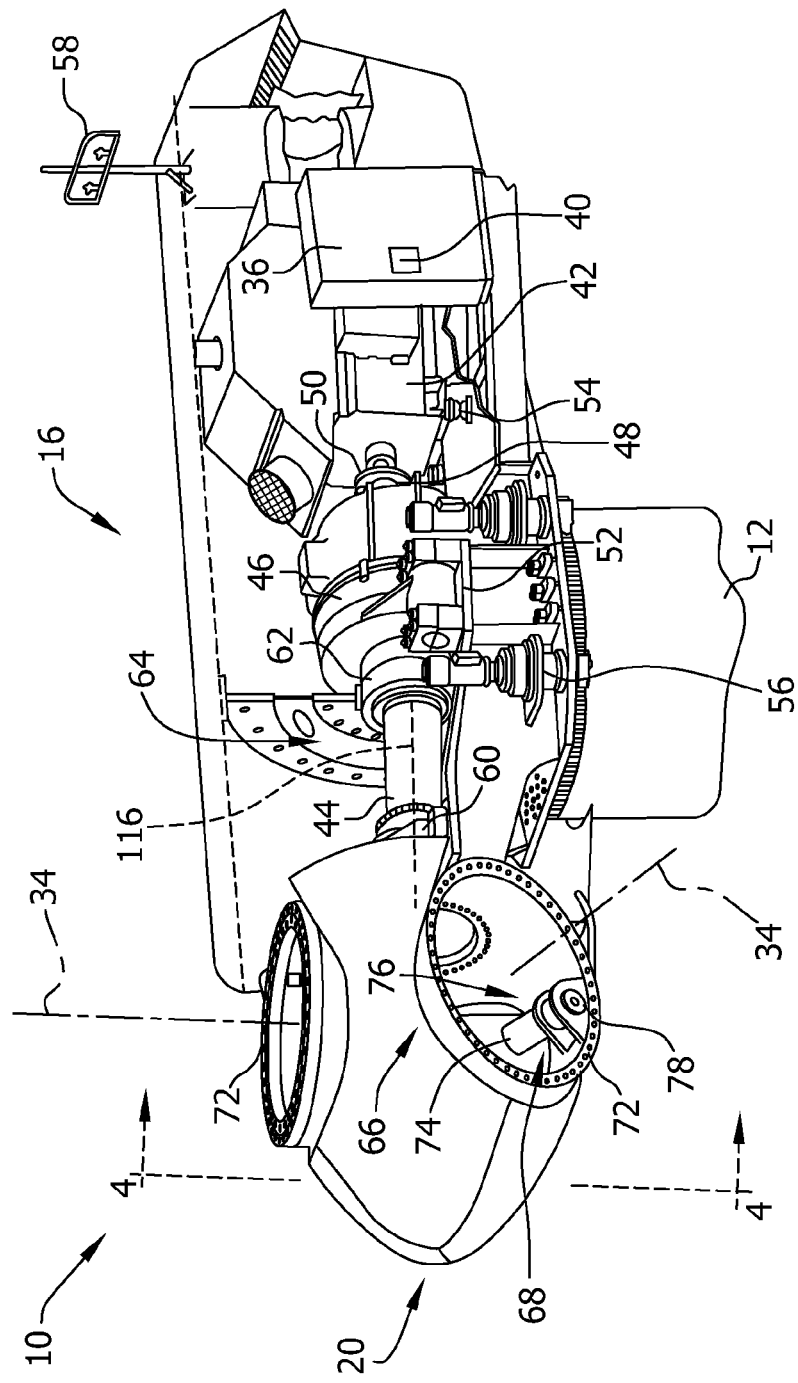
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxially to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electric power by generator 42. Gearbox 46 and generator 42 are supported by a support 52 and a support 54. In the exemplary embodiment, gearbox 46 utilizes a dual path geometry to drive high speed shaft 48.

As an alternative to coupling of rotor shaft 44 to electric generator 42 through gearbox 46, wind turbine 10 may be a gearless direct-drive wind turbine. In particular, rotor shaft 44 may be coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

In the exemplary embodiment, each pitch drive system 68 includes at least one pitch drive motor 74. Pitch drive motor 74 is any electric motor driven by electric power that enables pitch drive system 68 to function as described herein. Alternatively, pitch drive system 68 include any suitable structure, configuration, arrangement, and/or components such as, but not limited to, hydraulic cylinders, springs, and servomechanisms. Moreover, pitch drive system 68 may be driven by any suitable means such as, but not limited to, hydraulic fluid, and/or mechanical power, such as, but not limited to, induced spring forces and/or electromagnetic forces.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electric power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

As mentioned above, wind turbine 10 is equipped with control system 36. In the exemplary embodiment, control system 36 is configured to operate different functions of wind turbine 10 as described herein. In particular, processor 40 of control system 36 is typically programmed for implementing operational steps according to embodiments herein. Accordingly, programming processor 40 facilitates the technical effect of providing a more efficient noise reduction operation, in which an unstable grid may be stabilized producing a low impact of resulting acoustic emissions from the wind turbine. More specifically, stabilization may be performed without compromising compliance with noise regulations applying to wind turbine 10.

Control system 36 may be operatively coupled to other control systems for implementing the different control functions of wind turbine 10 such as, but not limited to, yaw control, stall control, or generator torque control. Further, control system 36 may be configured for coordinating operation of wind turbine 10 with other turbines in a wind park (not shown) and/or with a power grid. Control system 36 may be operatively connected to other control systems, for example, through a communication network based on electrical connections or wireless means. In the exemplary embodiment, control system 36 is shown as being centralized within nacelle 16. Alternatively or in addition thereto, control system 36 may be a distributed system throughout wind turbine 10, on support system 14, within a wind farm, and/or at a remote control center.

As set forth above, control system 36 includes processor 40 configured to perform the methods and/or steps described herein. Further, other components described herein (e.g., pitch drives, yaw drives, or generator components) may also include a processor for implementing specific functions. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

In the exemplary embodiment, control system 36 includes a real-time controller (not shown) that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, the real-time controller may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring at substantially short period of time after a change in the inputs affect the outcome, with the time period being a design parameter that may be selected based on the importance of the outcome and/or the capability of the system processing the inputs to generate the outcome.

According to embodiments herein, wind turbine 10 can operate in a noise reduction mode. A noise reduction mode is typically for controlling the potential or effective acoustic emissions of wind turbine 10. Typically, wind turbine 10 generates two types of acoustic emissions: i) acoustic emissions caused by aerodynamic effects; and ii) acoustic emissions caused by mechanical effects. A noise reduction mode according to embodiments herein is typically directed to reduce both types of emissions to comply with some predetermined conditions, for example with a noise regulation applying in the area in which wind turbine 10 is installed.

According to typical embodiments, control system 36 is configured to implement a noise reduction mode for accordingly operating wind turbine 10 when required. Alternatively or in addition thereto, operation of wind turbine 10 in a noise reduction mode may be implemented by a specific control system or via a remote controller (not shown). According to some embodiments, wind turbine 10 is operated for generating noise level below a particular sound level.

Typically, aerodynamic noise is related to the ratio of the blade tip speed to wind speed. In particular, as the speed of rotor blades 22 increases, an amplitude (not shown) of acoustic emissions (not shown in FIG. 1) from rotor blades 22 increases. Conversely, as speed of rotor blades 22 decreases, an amplitude of acoustic emissions from blades 22 decreases. Therefore, the amplitude of acoustic emissions from rotor blades 22 is typically directly proportional to a linear speed of rotor blades 22. Hence, it follows that the amplitude of acoustic emissions from rotor blades 22 and, therefore of the noise produced by wind turbine 10, is indirectly proportional to the blade pitch angle.

Typically, control system 36 is configured to operate wind turbine 10 in a noise reduction mode by controlling or adjusting the amplitude of acoustic emissions from blades 22. In particular, control system 36 may be configured for adjusting the rotational speed of rotor 18 in a manner such that noise produced by wind turbine 10 is below certain noise limits. In particular, control system 36 may collectively adjust the pitch angle of rotor blades 22 for maintaining noise produced by wind turbine 10 sufficiently low. Other suitable methods may be used for reducing the rotational speed such as, but not limited to, torque control of rotor 18.

Typically, the reduction of rotational speed during a stabilization event is performed as a function of at least one of wind speed, generated power and an actual grid frequency or, more specifically, the difference between an actual grid frequency and a reference frequency value. The reference frequency value typically corresponds to the nominal grid frequency or to a value close thereto.

Alternatively or in addition thereto, noise reduction operation may be implemented by individually modulating the pitch angle for each rotor blade 22. Thereby, a cross-sectional area of each blade that is exposed to wind can be adjusted for effectively decreasing acoustic emissions of wind turbine 10. For example, implementation of a noise reduction operational mode may include: i) increasing the pitch angle of rotor blades 22, as a rotor blade 22 rotates through a first range of blade azimuth values, to reduce acoustic emissions generated by the wind turbine; and, ii) decreasing the pitch angle of rotor blades 22 as a rotor blade 22 rotates through a second range of blade azimuth values, to increase electric power generated by the wind turbine. In this noise reduction strategy, the pitch angle is typically chosen as a function of the azimuth angle. More specifically, the pitch angle may be proportional to the azimuth angle by a factor dependent of the wind speed and/or generated power. An azimuth angle refers to a rotation angle of rotor blades 22 in the rotational plane of rotor 18.

Such an specific modulation of pitch angles is described in the European patent application with publication number EP 2 177 755, which is incorporated herein by reference to the extent in which this document is not inconsistent with the present disclosure, and in particular those parts thereof describing noise reduction operation by modulation of pitch angles. Noise reduction operation modes of wind turbine 10 are not limited to the operational modes described above. Further, wind turbine 10 may combine different noise reduction strategies. In particular, wind turbine 10 may implement any suitable noise reduction operation mode that facilitates wind turbine operation according to embodiments herein.

As set forth above, control system 36 may be operatively coupled to a noise sensor system (e.g., a sensor system constituted by near field microphone 98 and far field microphone 100). Control system 36 may process the information from the noise sensor system and accordingly operate wind turbine 10. For example, control system 36 may use the data provided by the noise sensor system to determine whether wind turbine 10 has to be operated in a noise reduction mode. Further, once wind turbine 10 is under noise reduction operation, control system 36 may continuously adjust operational parameters of wind turbine 10 (e.g., pitch angle) using information from the noise sensor system for online control of the acoustic emissions produced by the wind turbine and the noise impact thereof.

According to at least some embodiments herein, wind turbine 10 is operated for complying with noise regulations applying in the area in which wind turbine 10 is installed. Noise regulations may rule a sound level corresponding to a maximum allowed absolute noise level, regardless of the noise contribution of the wind turbine. Thus, a wind turbine may be forced to run in a reduced noise mode irrespective of the contribution to noise made by the wind turbine. Alternatively, noise regulations may rule a sound level corresponding to a maximum allowed noise emergence relative to an initial, existing background noise level. Noise emergence refers to a relative noise level increase related to a wind turbine relative to a background noise level non-related to a wind turbine.

Figure 3:
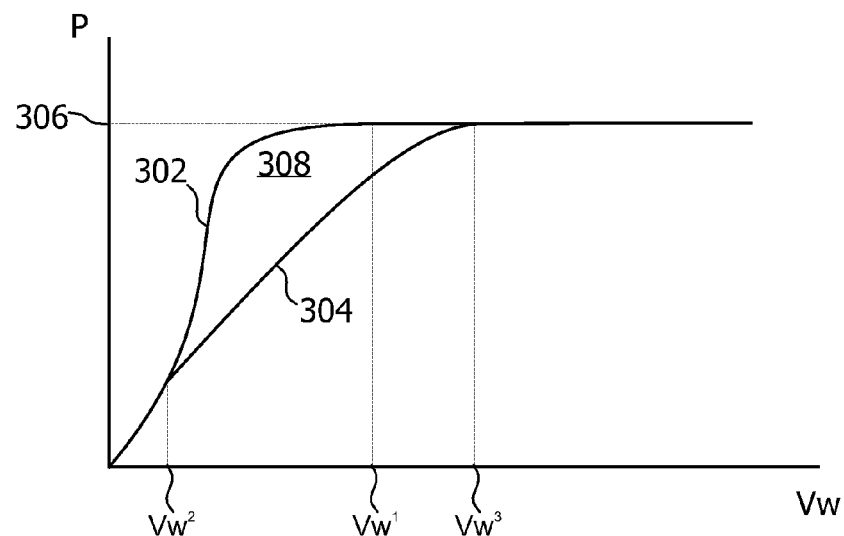
FIG. 3 is a schematic graphical representation of power generation by the wind turbine of FIG. 1.

Typically, noise regulations allowing a maximum allowed noises emergence (i.e., considering background noise) enable that noise reduction operation is limited to a range of low wind speeds since for higher wind speeds noise emergence of wind turbine 10 is negligible relative to background noise produced by the wind, as illustrated in FIG. 3, which schematically represents power generation by wind turbine 10. FIG. 3 further illustrates that noise reduction operation typically results in an operating mode, in which wind turbine 10 generates an electric power below the electric power that the wind turbine could potentially generate without operating in the noise reduction mode in view of the particular wind conditions.

In particular, the graph of FIG. 3 shows two curves 302, 304 representing electric power P generated by the wind turbine (vertical axis) for different wind speeds Vw (horizontal axis). Curve 302 corresponds to an operational mode, in which wind turbine 10 is operated for producing maximum electric power as enabled by the particular wind conditions and without restricting wind turbine power generation by operation in a noise reduction mode. Wind turbine 10 generates electric power at a rated power capacity 306 for a wind speed $Vw^1$ in the operational mode corresponding to curve 302. The rated electric power typically corresponds to the power rating of a wind turbine according to a guideline set by the manufacturer as the maximum power to be generated with that device. This limit is typically set somewhat lower than the level where the wind turbine would be damaged, to allow a margin of safety. For example, but not limited to, a wind turbine according to embodiments herein may be rated to generate a power between 1 MW and 7.5 MW such as 1.5 MW, 2.5 MW, or 4 MW.

Curve 304 corresponds to an operational mode, in which wind turbine 10 is operated in a noise reduction mode for wind speeds between $Vw^2$ and $Vw^3$. For wind speeds lower than $Vw^2$ noise emergence of wind turbine 10 is below an upper noise limit and, therefore, noise reduction operation is not required. For wind speeds higher than $Vw^3$, noise emergence of wind turbine 10 is negligible relative to background noise produced by the wind and, therefore, noise reduction operation is not required so that electric power at rated power capacity 306 can be generated. Therefore, wind turbine 10 is typically operated in a noise reduction mode for a relatively low wind speed range. A low speed range according to embodiments herein may be a range between 2 m/s and 11 m/s or, more specifically, between 3 m/s and 10 m/s. In particular, the upper limit of the low wind speed range is typically equal to or higher than the wind speed value at which wind turbine 10 could be operated at rated power.

The area 308 between curves 302 and 304 represents the extra capacity of wind turbine 10 for generating power during noise reduction operation. As the present inventors have understood and according to embodiments herein, this extra power generation capacity may be used to compensate instabilities of the power grid without compromising an adequate acoustic emission of wind turbine 10.

As set forth above, a wind turbine according to embodiments herein is connected to a power grid for delivering electric power thereto. Typically, a power grid is characterized by a grid frequency, i.e., the frequency at which electric current is transmitted through the power grid. A power grid is typically designed for operating at a nominal grid frequency (e.g., 50 Hz or 60 Hz). However, in particular for weak power grids, fluctuations in the grid frequency may occur, for example, when a large supplier or a large consumer disconnects from the power grid. Such fluctuations may cause damages to electrical equipment connected to the power grid. As used herein, an unstable grid state refers to the state of a power grid subjected to such fluctuations.

Typically, an increase of power demand leads to an unstable grid state, in which the grid frequency is exceedingly low (i.e., the grid frequency is below a grid frequency reference value). In this case, the power grid may be supported (i.e., for facilitating a cease of the fluctuation) by generating and delivering an extra electric power thereto. As set forth above, embodiments herein facilitates an efficient operation of a wind turbine under noise reduction operation for supporting a power grid subjected to an instability corresponding to an exceedingly low grid frequency.

Figure 4:
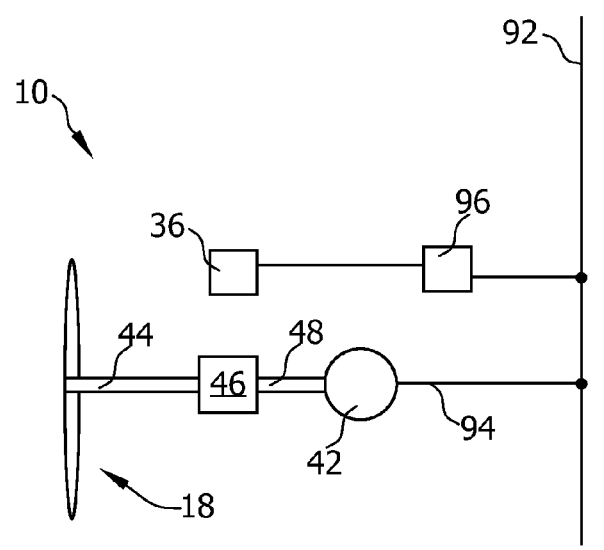
FIG. 4 is a schematic view of the coupling of the wind turbine of FIG. 1 to a power grid.

According to embodiments herein, a grid frequency of power grid 92 may be monitored for determining whether power grid 92 is in an unstable grid state. FIG. 4 exemplarily illustrates a coupling of wind turbine 10 to power grid 92 according to embodiments herein. As described above, rotor 18 may be coupled to gearbox 46 by rotor shaft 44. Gearbox 46 may be coupled to electric generator 42 through high speed shaft 48. Alternatively, rotor 18 may be directly coupled to generator 42 according to a direct-drive configuration of drive train 64. In the exemplary embodiment, electric generator 42 is coupled to power grid 92 through electrical connection 94.

According to embodiments herein, wind turbine 10 is configured to determine whether power grid 92 is in an unstable grid state corresponding to a grid frequency below a grid frequency reference value, e.g. an exceedingly low grid frequency caused by overload of power grid 92. The reference frequency value may correspond to a nominal grid frequency (e.g., 50 Hz or 60 Hz) or a frequency value close thereto such as, but not limited to: a) a grid frequency less than 0.033% or, more specifically, 0.02% of the nominal grid frequency; or b) a grid frequency less than a reference frequency value below the nominal frequency value such as a reference frequency value below the nominal frequency value minus 0.25 Hz or, more specifically, 0.50 Hz.

Wind turbine 10 may include or be communicatively coupled to a frequency sensor 96 for monitoring a grid frequency of power grid 92. Typically, frequency sensor 96 is a sensor for sensing an actual grid frequency. For example, but not limited thereto, frequency sensor 96 may be a grid monitor system (GMS) for monitoring the grid frequency. As another example, in case wind turbine 10 is an inverter based wind turbine, an inverter of wind turbine 10 may implement frequency sensor 96. Frequency sensor 96 is typically coupled to control system 36 through any suitable means (e.g., an electrical connection or a wireless communication system) so that control system 36 can receive information from frequency sensor 96.

According to embodiments herein, during operation of wind turbine 10, it might be determined whether power grid 92 is in an unstable state corresponding to an exceedingly low grid frequency. Typically, such an unstable state corresponds to an overload of the power grid. In order to determine such an unstable state of power grid 92, the grid frequency of the power grid may be monitored and an unstable state may be determined when the grid frequency is below the nominal grid frequency or other frequency reference value (e.g., a grid frequency below 0.5 Hz of the nominal grid frequency).

Determining whether power grid 92 is in an unstable state corresponding to an exceedingly low grid frequency may be performed by any other suitable method that allows wind turbine 10 to operate as described herein. For example, but not limited to, changes in the load coupled to power grid 92 may be monitored or estimated alternatively or in addition to grid frequency monitoring. For example, events indicating a probable overload, such as weather change, might be used to determine whether an unstable state of power grid 92 may occur. As a further example, an external signal indicating an unstable grid state according to embodiment herein may be sent to wind turbine 10. Such an external signal may be provided, for example but not limited to, by the power grid operator in order to indicate energy providers that power grid 92 requires support. As a further example, an unstable state may be determined by measuring the voltage of power grid 92.

Control system 36 typically processes the information received from frequency sensor 36 for determining whether power grid 92 is in an unstable grid state corresponding to an exceedingly low grid frequency. For example, but not limited to, control system 36, in collaboration with frequency sensor 96, may determine an actual grid frequency. Further, control system 36 may determine whether the actual grid frequency is lower than a reference frequency value as described above. That is, in the latter example, an unstable grid state is determined when the actual value of the grid frequency falls below a threshold value. Thereby, a small fluctuation of the grid frequency would not trigger a stabilization event according to at least some embodiments herein.

According to typical embodiments, the electric power delivered by wind turbine 10 to power grid 92 is increased when an unstable grid state is detected. According to at least some embodiments, the power increase is effected by increasing the rotational speed of rotor 18. In particular, the rotational speed of rotor 18 may be increased by collectively changing the pitch angle of rotor blades 22. In particular, the pitch angle may be decreased for increasing the rotor speed and, consequently, increasing electric power generation. This pitch angle change is typically performed by due considering: a) an actual value of the grid frequency; and/or b) a potentially or effectively resulting noise increase.

Regarding a), the change in pitch angle may be chosen for being proportional to the difference between an actual grid frequency and a reference frequency value. More specifically, the pitch angle may be indirectly proportional to this difference. The reference frequency value may correspond to a nominal grid frequency (e.g., 50 Hz or 60 Hz) or a frequency value close thereto such as, but not limited to: a) a grid frequency less than 0.33% or, more specifically, 0.02% of the nominal grid frequency; or b) a grid frequency less than a reference frequency value below the nominal frequency value such as a reference frequency value below the nominal frequency value minus 0.25 Hz or, more specifically, 0.5 Hz. Thereby, a fast response to grid instabilities may be achieved. Regarding b), typically, the pitch angle is changed in a manner such that a potentially or effectively resulting noise does not exceed an absolutes maximum and/or the contribution thereof to emitted noise over time does not exceed a specific value as further detailed below. Thereby, noise impact of grid stabilization by collectively changing the pitch angle of rotor blades 22 can be reduced.

According to at least some embodiments, which might be combined with other embodiments herein, the response to a determined unstable grid state includes individually modulating the pitch angle for each rotor blade 22 as described above and further detailed in the EP 2 177 755. However, for stabilizing the determined unstable grid state according to embodiments herein, the pitch angle increase and the pitch angle decrease may be adjusted in dependence of: a) an actual value of the grid frequency; and/or b) a potentially or effectively resulting noise increase.

This may be performed analogously as set forth above regarding a collective change of pitch angle. In particular, the pitch angle increase and the pitch angle decrease may be proportional to the difference between an actual grid frequency and a reference frequency value as set forth above. More specifically, the pitch angle may be proportional to a function of a rotor blade azimuth angle by a variable factor. The variable factor is typically dependent of the wind speed and an actual grid frequency or, more specifically, the difference between an actual grid frequency and the reference frequency value as set forth above.

Figure 6:
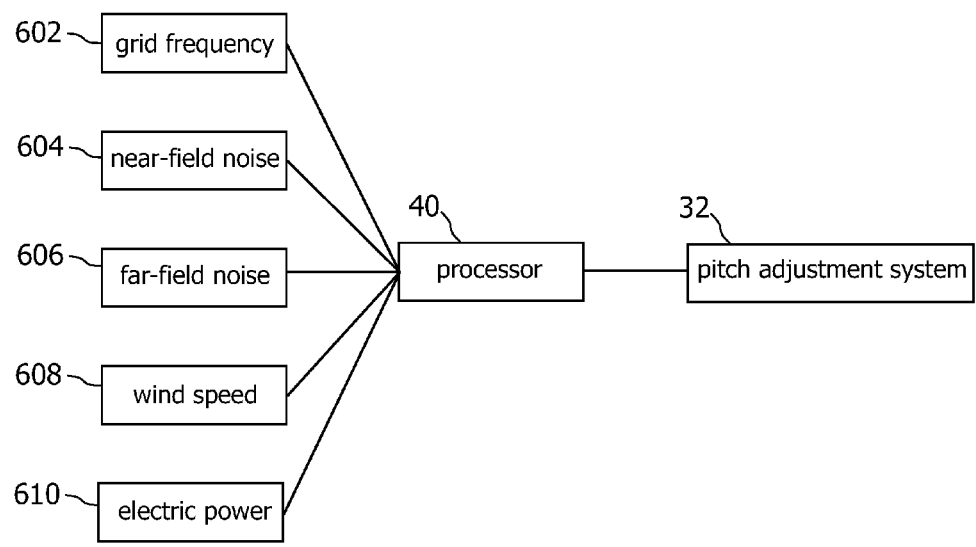
FIG. 6 is a schematic graphical representation of a scheme for operation of wind turbine 10.

FIG. 6 is a schematic graphical representation of a scheme for operation of wind turbine 10. As schematically represented, wind turbine 10 may process information corresponding to at least one of the following parameters: grid frequency 602, near-field noise 604, far-field noise 606, wind speed 608, or electric power 610 generated by wind turbine 10. In particular, one or more signals corresponding to at least one of these parameters may be provided to processor 40. Further, wind turbine 10 may be operated in consideration of at least one of these parameters. In particular processor 40 may implement increasing of the electric power generated by wind turbine 10 for supporting stabilization of an unstable grid according to embodiments herein in consideration of at least one of these parameters or, more specifically of at least: a) resulting noise increase (e.g., based on at least one of near-field noise 604 or far-field noise 606); and b) grid frequency 602.

Exemplarily, processor 40 may implement a pitch correction algorithm that processes and uses information related to at least one of parameters 602, 604, 606, 608, or 610. For example, processor 40 may communicate with pitch adjustment system 32 for collectively adjusting pitch of rotor blades 22 according to these parameters. Alternatively, or in addition thereto, processor 40 may communicate with pitch adjustment system 32 for individually adjusting pitch of rotor blades 22 according to these parameters and the respective azimuth angles of rotor blades 22, as described above.

According to embodiments herein, the power increase performed for stabilizing an unstable power grid is performed during a stabilization time period. Further, the electric power is typically increased in consideration of a resulting noise increase or, more specifically, of a potentially or effectively resulting noise increase. Thereby, noise impact of a grid stabilization event may be suitably controlled. According to embodiments herein, a potentially resulting noise increase is a noise increase expected from a particular change in the operation of wind turbine 10. Further, according to embodiments herein, an effective noise increase is a noise increase resulting from a particular change in the operation of wind turbine 10. A potentially resulting noise increase may be estimated, for example, using a theoretical or semi-empirical model of wind turbine 10. Thereby, noise impact of a specific stabilization event may be estimated a priori. An effective noise increase may be determined using, for example, a noise sensor system as described above for considering noise produced by a power increase in a stabilization event.

According to at least some embodiments herein, the electric power increase during a stabilization time period is performed in consideration of a potentially or effectively resulting noise increase. Resulting noise may be considered in different manners as set forth below. Typically, a noise increase resulting from supporting stabilization of an unstable grid is below a selected upper level. For example, an upper level may be selected by processor 40 considering a noise impact of a stabilization event or using pre-determined values, Additionally or alternatively thereto, an upper level may be selected from values externally provided to wind turbine 10. For example, a centralized control of a wind park may provide upper sound levels to wind turbine 10. These examples of a selected noise level are not limiting. Wind turbine 10 may be operated using a sound level selected in any suitable manner such that an unstable grid can be stabilized according to embodiments herein.

During a stabilization event, the increase of power generation may be performed in a manner such that a resulting noise is below certain absolute limits. Thereby, during a stabilization event, noise produced by wind turbine 10 may exceed the normal limits reached during standard noise reduction operation (i.e., without specifically supporting an unstable power grid) but still be sufficiently low so that the risk of producing a significant noise impact in the surrounding area is avoided or reduced.

In an embodiment, wind turbine 10 generates noise below a lower sound level before and after a stabilization time period, and the wind turbine generates noise between a lower sound level and a selected upper level during the stabilization time period. For example, wind turbine 10 may be operated for generating noise below a first absolute maximum. At a particular moment, it might be determined that the power grid is unstable and power delivered by wind turbine 10 may be increased during a stabilization time period. It will be understood that the increase of delivered power does not necessary imply a steady increase of power during the stabilization time period. For example, the power might be increased to a particular level and maintained during a portion of the stabilization time period. Typically, the power delivered by wind turbine 10 during a stabilization time period is greater than power delivered during an equivalent time period in noise operation of wind turbine 10.

The chosen power increase may be such that an estimated noise increase is below an absolute maximum such as a noise corresponding to a sound power of 3 dB or, more specifically, 2 dB or 1 dB. Alternatively or in addition thereto, noise increase may be monitored online by a noise sensor system as described above and the increase in power generation during a stabilization event may be controlled in a manner such that the monitored noise does not exceed the absolute maximum. After the stabilization event, wind turbine 10 may be operated for generating noise below the first absolute maximum, generally, by reducing the power generated by wind turbine 10.

As set forth above, increasing of the electric power for supporting stabilization of an unstable grid may be performed such that a resulting noise increase is below a selected first upper level. According to some embodiments, a selected upper level defines an average value, and wind turbine 10 generates on average noise below the selected upper level.

In particular, the stabilization time (i.e., the time during which power generation increase is performed) may be chosen in order to keep sufficiently low the noise impact produced by wind turbine 10 during a grid stabilization event. For example, the stabilization time may be a time period between 2 to 10 seconds or, more specifically, between 3 to 8 seconds such as 5 seconds. Depending on the specific location and circumstances of wind turbine 10, the stabilization time may be a longer time period, for example a time period in the order of minutes such as a period between 2 and 5 minutes or, more specifically, between 3 and 4 minutes. It should be noted that noise impact is typically dependent of exposure time to excessive noise. Therefore, a high noise level may be produced without causing excessive noise impact if the stabilization time is sufficiently low. Typically, the stabilization time is chosen in consideration of particular noise regulations applying to wind turbine 10.

According to at least some embodiments herein, when an unstable grid state is determined, control system 36 may operate wind turbine 10 for increasing the electric power in a manner such that the noise increase over a noise averaging time period does not exceed a predetermined upper noise limit. In particular, an average corresponding to a selected upper level defining an average value may be calculated for a selected time interval. Thereby, it is facilitated reducing noise impact of a stabilization event.

The predetermined upper noise limit and the noise averaging time period are typically such that noise impact of wind turbine 10 is sufficiently low. Further, these parameters are typically chosen for complying with a noise regulation applying in the area in which wind turbine 10 is installed. The noise averaging time period may be a time period in the order of seconds, hours, or days such as, but not limited to, a time period between 10 seconds and 30 seconds, a time period between 1 hour and 2 hours, or a time period between 1 day and 3 days (please indicate values). As set forth above, a stabilization time period is selected such that the noise increase is, on average, below the selected upper level A selected upper noise level may correspond to, for example, a sound exposure of 90 dB(A) over 8 hours, 95 dB(A) over 4 hours, 100 dB(A) over 2 hours, 110 dB(A) over ½ hour, or 115 dB(A) over ¼ hour in accordance with the ANSI recommendations for maximum noise exposure. The dB(A) values correspond to decibel values of the A scale as defined in IEC 60651. Alternatively or in addition thereto, the predetermined upper noise limit may correspond to an equivalent continuous sound, i.e., to an average sound energy produced for the noise averaging time period. Alternatively or in addition thereto, the predetermined upper noise limit may correspond to a sound level exceeded during a percentage of the operation time such as a 10% of the operation time or 90% percent of the operation time or time therebetween. Alternatively or in addition thereto, the predetermined upper noise limit may correspond to a day-night average sound level, i.e., the average sound level for a 24-hour time period.

Figure 5:
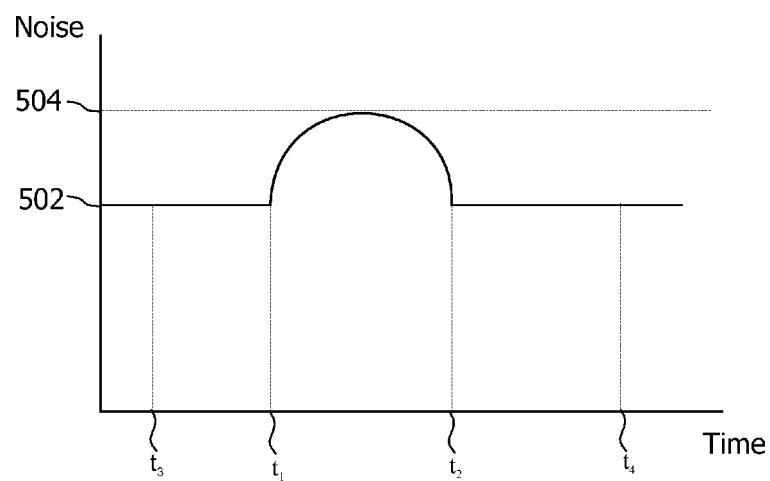
FIG. 5 is a schematic graphical representation of noise produced by the wind turbine of FIG. 1 during a time period including a stabilization event.

FIG. 5 schematically illustrates noise produced by wind turbine 10 being operated according to embodiments herein. In particular, FIG. 5 shows a stabilization event produced between time $t_1$ and time $t_2$ (i.e., a stabilization time period).

Before the stabilization event occurs, wind turbine 10 is operated in a noise reduction mode such that produced noise is at a noise level 502. Typically, noise level 502 is below a particular sound level. At time $t_1$ the produced noise is increased as a result of increasing the power generated by wind turbine 10 in order to support stabilization of power grid 92. During the stabilization event, wind turbine 10 is operated such that the produced noise is below an absolute maximum 504, which is a non-limiting example of a selected upper level according to embodiments herein. Once the stabilization event finishes, the power generation is decreased such that produced noise returns to noise level 502, i.e., to a noise level below a particular sound level.

Exemplarily, noise produced by wind turbine 10 may be subjected to the condition that noise produced over a noise averaging time period $t_3$ to $t_4$ is below a specific limit. In particular, some parameters for operation of wind turbine 10 may be adjusted. These parameters may include: i) the time during which stabilization of power grid 92 is supported, and/or ii) the increase of power generation for grid support. Typically, these parameters are chosen such that the total noise produced over the noise averaging time is below the specific limit.

For example, the increase in the generated electric power may be predetermined once a grid instability is detected. The predetermined increase is typically such that a potential or effective noise increase over the noise averaging time period does not exceed a predetermined upper noise limit as described above. Alternatively or in addition thereto, the stabilization time period may be also predetermined. The predetermined stabilization time period is typically such that a potential or effective noise increase over the noise averaging time period does not exceed the predetermined upper noise limit.

According to at least some particular embodiments, the grid frequency is also monitored during a stabilization event. Thereby, during a stabilization event, it may be determined whether power grid 92 is no longer in an unstable grid state (e.g., because grid frequency increases over a certain level). If the latter applies, the delivered electric power may be decreased so that generation of unnecessary noise is avoided.

According to at least some embodiments herein, operation of wind turbine 10 is such that noise regulations or noise recommendations are complied with. In particular, at least one of the electric power increase for supporting stabilization or the stabilization time period may be controlled in a manner such that operation of wind turbine 10 complies with particular noise regulations. For example, these operational parameters may be controlled so that the noise increase resulting from stabilization events complies with the recommendations of The Environmental Protection Agency (EPA), The American National Standards Institute (ANSI), the ISO 61400-11 and ISO 61400-14, or the US Occupational Safety and Health Administration (OSHA) or those regulation presently applying in France, Canada, or Australia.

According to at least some embodiments, wind turbine 10 forms part of a wind turbine including a plurality of wind turbines. Control of the plurality of wind turbines may be coordinated in order to support an unstable power grid according to embodiments herein. For example, the plurality of wind turbines may be operated in a noise reduction mode such that noise impact of the wind park is below some predetermined limits. If an unstable grid state corresponding to an exceedingly low grid frequency is detected, the plurality of wind turbines may be collectively operated for supporting the unstable grid. For example, electric power generation in the wind park may be increased during a stabilization time period so that the unstable grid state is supported. The increase in power generation of the wind park may be performed by considering the potentially or effectively resulting noise increase so that it is facilitated avoiding an excessive noise impact of the stabilization event.

Exemplary embodiments of systems and methods for operating a wind turbine are described above in detail. The systems and methods are not limited to the specific embodiments described herein, but rather, components of the systems and/or steps of the methods may be utilized independently and separately from other components and/or steps described herein. For example, potentially or effectively resulting acoustic emissions caused by mechanical effects may be considered during a stabilization event.

As another example, pitch changes described herein for supporting stabilization of an unstable grid may be performed in dependence of at least one of a wind speed, a generated electric power, a measured grid frequency, IEC noise, or far-field noise. Further, embodiments herein are not limited to practice with only the wind turbine systems as described herein. Rather, the exemplary embodiment can be implemented and utilized in connection with many other rotor blade applications used for delivering electric power to a power grid and subjected to noise restrictions.

Although specific features of various embodiments of the invention may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a wind turbine coupled to a power grid for delivering electric power thereto, comprising:
   a) operating said wind turbine in a noise reduction mode;
   b) determining whether said power grid is in an unstable grid state corresponding to an increase of power demand; and,
   c) increasing the electric power delivered by the wind turbine to said power grid during a stabilization time period for supporting stabilization of the unstable grid, wherein said increasing of the electric power for supporting stabilization of the unstable grid is performed such that a resulting noise increase is below a selected upper level.

2. The method according to claim 1, wherein:
   a) the wind turbine generates noise below a lower sound level before and after said stabilization time period; and,
   b) the wind turbine generates noise between said lower sound level and said selected upper level during said stabilization time period.

3. The method according to claim 1, wherein said selected upper level defines an average value, and the wind turbine generates on average noise below said selected upper level.

4. The method according to claim 3, wherein the average is calculated for a selected time interval.

5. The method according to claim 3, wherein said stabilization time period is selected such that the noise increase is on average below said selected upper level.

6. The method according to claim 1, wherein determining whether said power grid is in an unstable grid state includes monitoring a grid frequency of said power grid.

7. The method according to claim 6, wherein monitoring said grid frequency includes:
   i) determining an actual grid frequency; and,
   ii) determining whether said actual grid frequency is lower than a reference frequency value, said power grid being in an unstable grid state when the actual grid frequency is lower than said reference frequency value.

8. The method according to claim 7, wherein said wind turbine includes a rotor rotatable at a rotational speed and at least one rotor blade coupled to said rotor, and the increasing of the electric power for supporting stabilization of the unstable grid includes increasing the rotational speed of said rotor for performing the electric power increase.

9. The method according to claim 8, wherein increasing the rotational speed of said rotor includes changing a pitch angle of the at least one rotor blade in dependence of said actual grid frequency, and wherein the pitch angle change is proportional to the difference between said actual grid frequency and said reference frequency value.

10. The method according to claim 7, wherein operating said wind turbine in said noise reduction mode includes:
    i) increasing a pitch angle of the at least one rotor blade as the at least one rotor blade rotates through a first range of blade azimuth values to reduce acoustic emissions generated by the wind turbine; and,
    ii) decreasing the pitch angle of the at least one rotor blade as the at least one rotor blade rotates through a second range of blade azimuth values to increase electric power generated by the wind turbine,
    wherein, in said stabilization time period, the pitch angle increase and the pitch angle decrease depends of said actual grid frequency.

11. The method according to claim 10 wherein, in said stabilization time period, the pitch angle increase and the pitch angle decrease are proportional to the difference between said actual grid frequency and the reference frequency value.

12. A wind turbine control system for use in a wind turbine, comprising:
    a) at least one pitch adjustment system coupled to a rotor blade;
    b) at least one processor coupled to said at least one pitch adjustment system, wherein said at least one processor is programmed for:
       i) operating said wind turbine for generating noise below a first sound level;
       ii) determining whether a power grid is in an unstable grid state corresponding to a grid frequency below a grid frequency reference value;
       iii) increasing the electric power delivered by the wind turbine to said power grid during a stabilization time period for supporting stabilization of the unstable grid, wherein the wind turbine generates noise above the first sound level during said stabilization time period; and, iv) after said stabilization time period lapses, operating said wind turbine for generating noise below said first sound level;

wherein a noise increase resulting from supporting stabilization of the unstable grid is below a selected upper level.

13. The control system according to claim 12, wherein said selected upper level defines an average value, and said increasing of the electric power for supporting stabilization of the unstable grid is performed such that noise generated by the wind turbine over a noise averaging time period does not exceed said calculated upper level.

14. The control system according to claim 12, wherein said processor is coupled to a grid frequency sensor for monitoring a grid frequency and determining whether said power grid is in an unstable grid state includes monitoring a grid frequency of said power grid.

15. The control system according to claim 14, wherein said processor is further programmed for performing the increasing of the electric power for supporting stabilization of the unstable grid by changing a pitch angle of the rotor blade.

16. A wind turbine, comprising:
   a) a rotor rotatable at a rotational speed;
   b) at least one rotor blade coupled to said rotor;
   c) at least one pitch adjustment system coupled to the at least one rotor blade; and,
   d) at least one processor coupled to said at least one pitch adjustment system, wherein said at least one processor is programmed for:
      i) operating said wind turbine for generating noise below a first sound level;
      ii) determining whether a power grid is in an unstable grid state corresponding to a grid frequency below a grid frequency reference value;
      iii) increasing the electric power delivered by the wind turbine to said power grid during a stabilization time period for supporting stabilization of the unstable grid, wherein the wind turbine generates noise above the first sound level during said stabilization time period; and,
      iv) after said stabilization time period lapses, operating said wind turbine for generating noise below said first sound level,
   wherein a noise increase resulting from supporting stabilization of the unstable grid is below a selected upper level.

17. The wind turbine according to claim 16, wherein said selected upper level defines an average value, and said increasing of the electric power for supporting stabilization of the unstable grid is performed such that noise generated by the wind turbine over a noise averaging time period does not exceed said selected upper level.

18. The wind turbine according to claim 16, wherein said processor is coupled to a grid frequency sensor for monitoring a grid frequency and determining whether said power grid is in an unstable grid state includes monitoring a grid frequency of said power grid.

19. The wind turbine according to claim 18, wherein said processor is further programmed for performing the increasing of the electric power for supporting stabilization of the unstable grid by changing a pitch angle of the rotor blade.

20. The wind turbine according to claim 19, wherein the pitch angle change is directly proportional to the difference between an actual grid frequency and the reference frequency value.

* * * * *